(12) United States Patent
Caretta et al.

(10) Patent No.: US 7,911,332 B2
(45) Date of Patent: Mar. 22, 2011

(54) WHEEL HAVING A CONTROLLED PRESSURE AND A PRESSURE RESERVOIR

(75) Inventors: Renato Caretta, Milan (IT); Pier Giuseppe Piantanida, Milan (IT); Stefano Sangiovanni, Milan (IT); Maurizio Marchini, Milan (IT); Giorgia Sgalari, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 565 days.

(21) Appl. No.: 11/578,236

(22) PCT Filed: Apr. 23, 2004

(86) PCT No.: PCT/IB2004/001236
§ 371 (c)(1),
(2), (4) Date: Apr. 11, 2008

(87) PCT Pub. No.: WO2005/102743
PCT Pub. Date: Nov. 3, 2005

(65) Prior Publication Data
US 2009/0009310 A1    Jan. 8, 2009

(51) Int. Cl.
*B60C 23/00* (2006.01)
(52) U.S. Cl. ........ 340/442; 340/444; 340/447; 340/448; 152/331.1; 152/415; 152/418; 152/509; 152/519; 73/146.2; 73/146.3; 73/146.8
(58) Field of Classification Search .................. 340/442, 340/444, 447, 448; 73/146.2, 146.3, 146.8; 152/331.1, 415, 418, 509, 519
See application file for complete search history.

(56) References Cited

U.S. PATENT DOCUMENTS

| 3,934,223 | A |   | 1/1976 | Barabino |
| 4,067,376 | A |   | 1/1978 | Barabino |
| 5,452,753 | A | * | 9/1995 | Olney ............................. 152/417 |
| 5,891,278 | A | * | 4/1999 | Rivin ............................. 152/418 |
| 6,533,010 | B1 | * | 3/2003 | Alonso et al. .................. 152/419 |
| 6,601,625 | B2 |   | 8/2003 | Rheinhardt |

FOREIGN PATENT DOCUMENTS

| DE | 36 31 712 A1 | 3/1988 |
| DE | 43 44 524 A1 | 6/1995 |
| DE | 297 18 420 U1 | 12/1997 |

* cited by examiner

*Primary Examiner* — Tai T Nguyen
(74) *Attorney, Agent, or Firm* — Finnegan, Henderson, Farabow, Garrett & Dunner, L.L.P.

(57) ABSTRACT

A wheel having a controlled pressure includes a rim associated with a tank adapted to be filled with a fluid to a first pressure; a tire mounted on the rim and having an inner volume inflated to an operating pressure at a reference temperature, the operating pressure being lower than the first pressure; and at least one valve assembly adapted to establish a communication between the tank, the inner volume of the tire and the external environment. The valve assembly includes a command valve, an exhaust valve and a compensation valve operatively associated with each other. The command valve controls communication between the tank and the inner volume of the tire. The exhaust valve is connected to the external environment, to the inner volume, to the command valve and to the compensation valve. The compensation valve is connected to the exhaust valve and the command valve. The command valve includes an inner chamber connected with the exhaust valve and the compensation valve in such a manner that the command valve is operated by the exhaust valve and the compensation valve through a pressure variation of the inner chamber in response to a variation of the inner pressure of the tire.

40 Claims, 13 Drawing Sheets

WHEEL HAVING A CONTROLLED PRESSURE AND A PRESSURE RESERVOIR

CROSS REFERENCE TO RELATED APPLICATION

This application is a national phase application based on PCT/IB2004/001236, filed Apr. 23, 2004, the content of which is incorporated herein by reference.

BACKGROUND OF THE INVENTION

1. Field of the Invention

The present invention relates to a wheel having a controlled pressure.

2. Description of the Related Art

A wheel for two-wheeled or four-wheeled vehicles generally comprises a rim coupled with a pneumatic tyre that is inflated to a predetermined operating pressure.

Said tyre generally comprises a carcass structure having at least one carcass ply and at least one annular reinforcing structure associated with the carcass ply, a tread band of an elastomer material at a radially external position to the carcass structure, a belt structure interposed between the carcass structure and the tread band and a pair of sidewalls located at axially opposite positions on the carcass structure.

In tubeless tyres the tyre airtightness is ensured by the radially inner layer of said carcass structure generally referred to as "liner". In use, due for example to the natural air loss through said liner (which generally is not perfectly airtight), pressure within the tyre decreases so that the vehicle's driver is obliged to a periodical restoration of said pressure.

In an attempt to make the tyre pressure substantially constant over a rather long period of time, a solution has been suggested which contemplates use of rims internally housing a tank of gas under pressure to a higher pressure than the operating pressure of the tyre. By means of one or more valves suitably operated, pressure is restored when required.

U.S. Pat. No. 6,601,625 B2 discloses a wheel with a compressed-air tank integrated into the rim. More specifically, it is disclosed a high-pressure tank to store compressed air from an outer source, a first mechanical valve allowing the compressed air to flow from an outer source to the high-pressure tank, a second mechanical valve allowing air passage from the high-pressure tank to the inner tube of the tyre, a third valve releasing air from the inner tube of the tyre and a fourth valve releasing air from the high-pressure tank. The wheel described in said patent keeps the tyre pressure within a predetermined value in a mechanical manner, so that the necessity for the vehicle's driver to manually inflate the tyre for reaching the desired pressure is reduced. When pressure within the tyre decreases below a predetermined threshold value, the air stored in the high-pressure tank is released into the tyre so that the latter is maintained inflated to the desired minimum pressure, whereas when pressure in the tyre increases beyond a predetermined threshold value, the air is released from the tyre into the surrounding atmosphere.

U.S. Pat. No. 4,067,376 discloses a system for automatically re-admitting the air lost by a tyre during the vehicle running in order to minimise the effect of a burst. The wheel is made with an integrated annular bladder that is adapted to store an amount of compressed air under high pressure. A pressure safety valve is placed between said bladder and the tyre and is adapted to release air from the bladder to the tyre each time pressure within the tyre decreases under a predetermined limit.

SUMMARY OF INVENTION

The Applicant realised that known devices do not enable a precise adjustment of the operating pressure of the tyre, which adjustment is particularly important for a tyre suitable for high performance both for two-wheeled and four-wheeled vehicles. In fact, for the vehicle roadholding and handling, above all as far as mixed paths of travel at high speed are concerned, a tyre in excellent conditions is required, which conditions cannot be obtained without a serious control of the operating pressure. Finally, maintaining a correct and constant operating pressure also allows problems of uneven or early wear of the tread band to be avoided.

The Applicant has therefore perceived that for efficiently controlling the inner pressure of a tyre over long periods of time, of one year or more for example, without a manual reloading of the compressed air into the tyre being required, it is necessary to cause the step of restoring the operating pressure of the tyre to take place in an automatic and timely manner and with the desired accuracy.

In addition, in case of puncture, a system must be available that is able to maintain a residual pressure sufficient to ensure the vehicle control as long as possible. According to the Applicant, this feature is achieved by providing a tank using up its pressure together with the tyre.

The Applicant however felt the necessity not to make the "wheel" system more complicated with the addition of sensors and electronic devices to carry out restoration of the operating pressure of the tyre in the manner as above illustrated, trying to find an accurate and reliable solution in the mechanical field.

To this aim the Applicant could verify that the above discussed problem can be overcome by making at least one valve assembly inserted between a tank of fluid under pressure associated with the rim of a wheel and the tyre mounted on said rim, where at least one valve of said assembly allows communication between the tank and the tyre, said valve being operated by at least another valve of said assembly which is responsive to lowering of the tyre pressure, so that the operating pressure of the tyre can be restored with the desired precision and timeliness.

In a first aspect, the invention relates to a method of controlling the inner pressure of a tyre mounted on a rim, said method comprising the steps of:

inflating an inner volume of the tyre to an operating pressure and at a reference temperature;

admitting a fluid compressed to a first pressure into a tank associated with the rim, said first pressure being higher than the operating pressure of the tyre at the reference temperature, establishing a communication between the inner volume of said tyre and said tank when the inner pressure of said tyre is lower than said operating pressure;

stopping the communication between said inner volume and said tank when said inner pressure of the tyre is substantially the same as said operating pressure, wherein said step of establishing a communication between the inner volume of the tyre and the tank is carried out by at least one valve assembly comprising a command valve, an exhaust valve and a compensation valve operatively associated with each other and comprises the steps of: transmitting a pressure reduction of the tyre to the exhaust valve; generating a pressure reduction within the command valve through the exhaust valve, so as to operate the command valve and bring said inner pressure to a value substantially equal to the operating pressure; and said step of stopping said communication comprises the steps of: transmitting the inner pressure of the tyre, substantially equal to the operating pressure, to the exhaust valve and the compensation valve; generating a pressure increase within the command valve through the compensation valve, so as to operate the command valve stopping said communication.

It is further to be pointed out that known devices do not allow pressure variation within the tyre to be suitably compensated for, when said variation is due to important temperature variations, in the order of some ten degrees for example. More specifically, in the case of a strong reduction in the external temperature, the inner pressure of each tyre will decrease, since said pressure, as it is well known, is proportional to the absolute temperature in accordance with the gas laws. The Applicant could notice that a pressure restoration to such low temperatures through passage of fluid under pressure (compressed air, for example) from the tank to the tyre, would involve an overpressure during running or, at all events, at the moment the fluid temperature within the tyre should rise again. This overpressure can cause discharge of the previously admitted air to restore the correct operating pressure, thereby reducing the tank independence.

In accordance with a preferred embodiment of the method in question, said step of bringing the inner volume of said tyre into communication with said tank takes place at a temperature higher than a threshold temperature.

In a further preferred embodiment, operation of said command valve is controlled by an elastic element having an elastic constant K varying in a temperature range from −50° C. to +50° C. in such a manner that a closure member of said valve is maintained to a closed position following a reduction in the inner tyre pressure due to a temperature reduction within said range.

In accordance with a different preferred embodiment, said connection between the command valve and the external environment is obtained by the step of opening a first closure member of said exhaust valve having an inner chamber that is brought into communication with the external environment.

In accordance with another preferred embodiment, opening of said first closure member of said exhaust valve is controlled by an elastic element having an elastic constant K varying within a temperature range from −50° C. to +50° C. in such a manner that said first closure member and chamber are maintained isolated from the external environment following a pressure reduction of the inner volume of the tyre due to a temperature reduction within said range.

It will be recognised that in this manner in accordance with the invention, the operating duration of the tank of fluid under pressure is advantageously increased. In fact, fluid admission (air, for example) from the tank to said tyre is substantially inhibited when the tyre pressure decreases due to lowering of the external temperature, so that overpressures in the tyre and/or subsequent fluid discharges due to temperature increases are avoided.

In a further aspect, the invention relates to a wheel having a controlled pressure, comprising:
  a rim associated with a tank adapted to be filled with a fluid to a first pressure;
  a tyre mounted on said rim and having an inner volume inflated to an operating pressure at a reference temperature, said operating pressure being lower than said first pressure;
  at least one valve assembly adapted to establish a communication between said tank, the inner volume of said tyre and the external environment;

wherein said valve assembly comprises a command valve, an exhaust valve and a compensation valve operatively associated with each other; and wherein:
  said command valve controls communication between said tank and said inner volume of the tyre;
  said exhaust valve is connected to the external environment, to said inner volume, to said command valve and compensation valve;
  said compensation valve is connected with said exhaust valve and said command valve;
wherein said command valve comprises an inner chamber connected to said exhaust valve and said compensation valve, in such a manner that said command valve is operated by said exhaust valve and said compensation valve through a pressure variation of said inner chamber in response to a variation of the inner pressure of the tyre.

In a preferred embodiment, in order to optimise the available spaces, said tank is integrated into said rim.

In a further embodiment, in order to divide the available volumes in an optimal manner, said tank takes up such a volume that the ratio between said volume of said tank and said inner volume of the tyre is included between about 0.1 and about 0.4.

In a different embodiment, said ratio is included between about 0.12 and 0.25.

In a preferred embodiment, said wheel comprises an inflating valve operatively associated with said tank.

BRIEF DESCRIPTION OF DRAWINGS

Further features and advantages of the invention will become more apparent from the detailed description of some preferred, but not exclusive, embodiments of a wheel having a controlled and compensated pressure in accordance with the present invention.

This description will be taken hereinafter with reference to the accompanying drawings, given by way of non-limiting example, in which.

DETAILED DESCRIPTION OF THE INVENTION

Figure 1:
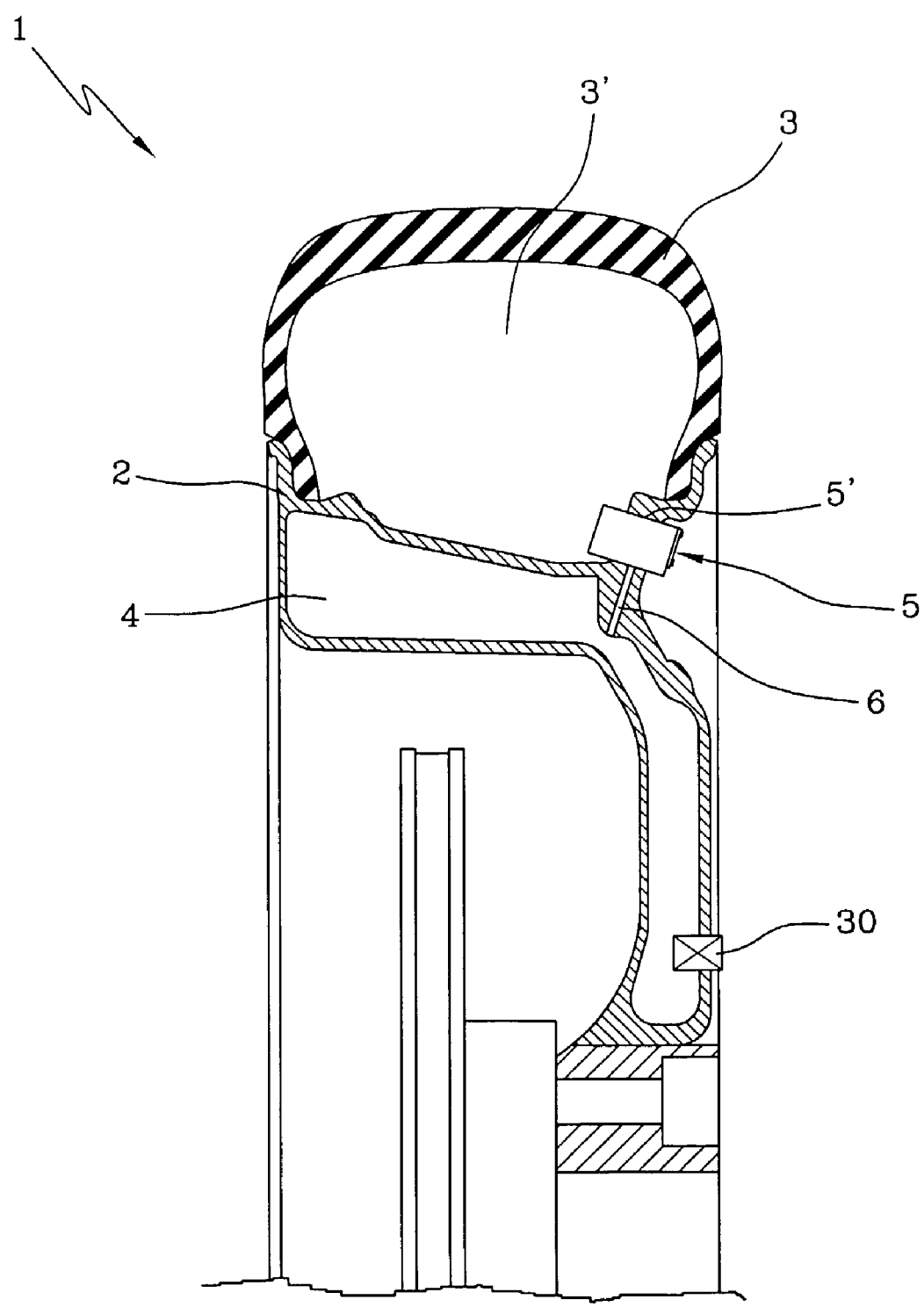
FIG. 1 is a side view partly in section of a wheel in accordance with the invention.

As shown in FIG. 1, the wheel 1 for two-wheeled or four-wheeled vehicles in accordance with the invention comprises a rim 2 on which a tyre 3 having an inner volume 3' is mounted. Associated with rim 2 and preferably integrated thereinto is a tank 4 suitable to contain a fluid under pressure, said fluid being air or a substantially inert gas such as nitrogen, for example.

According to a preferred embodiment, the ratio between the operating pressure of tyre 3 and a first pressure existing in said tank 4 when fully loaded varies between about 0.1 and about 0.6, preferably between about 0.2 and about 0.4.

In accordance with a further preferred embodiment, the ratio between the volume of said tank 4 and said inner volume 3' of the tyre is included between about 0.1 and about 0.4, preferably between about 0.12 and about 0.25.

The rim 2 preferably houses a valve assembly 5 of the mechanical type in a seat 5' formed at a radially external position, which valve assembly allows communication between tank 4, the inner volume 3' of tyre 3 and the surrounding atmosphere to be obtained.

Preferably, said communication takes place by providing at the inside of rim 2, a duct 6 connecting said valve assembly 5 with said tank 4. In addition, once the valve assembly 5 has been positioned in its seat 5' the axially inner and axially outer ends thereof with respect to wheel 1 are respectively in communication with the inner volume 3' of the tyre and the surrounding environment.

An inflating valve 30 is operatively associated with said tank 4. In a preferred embodiment (not shown in the figures) said inflating valve is integral with said valve assembly 5.

Figure 2:
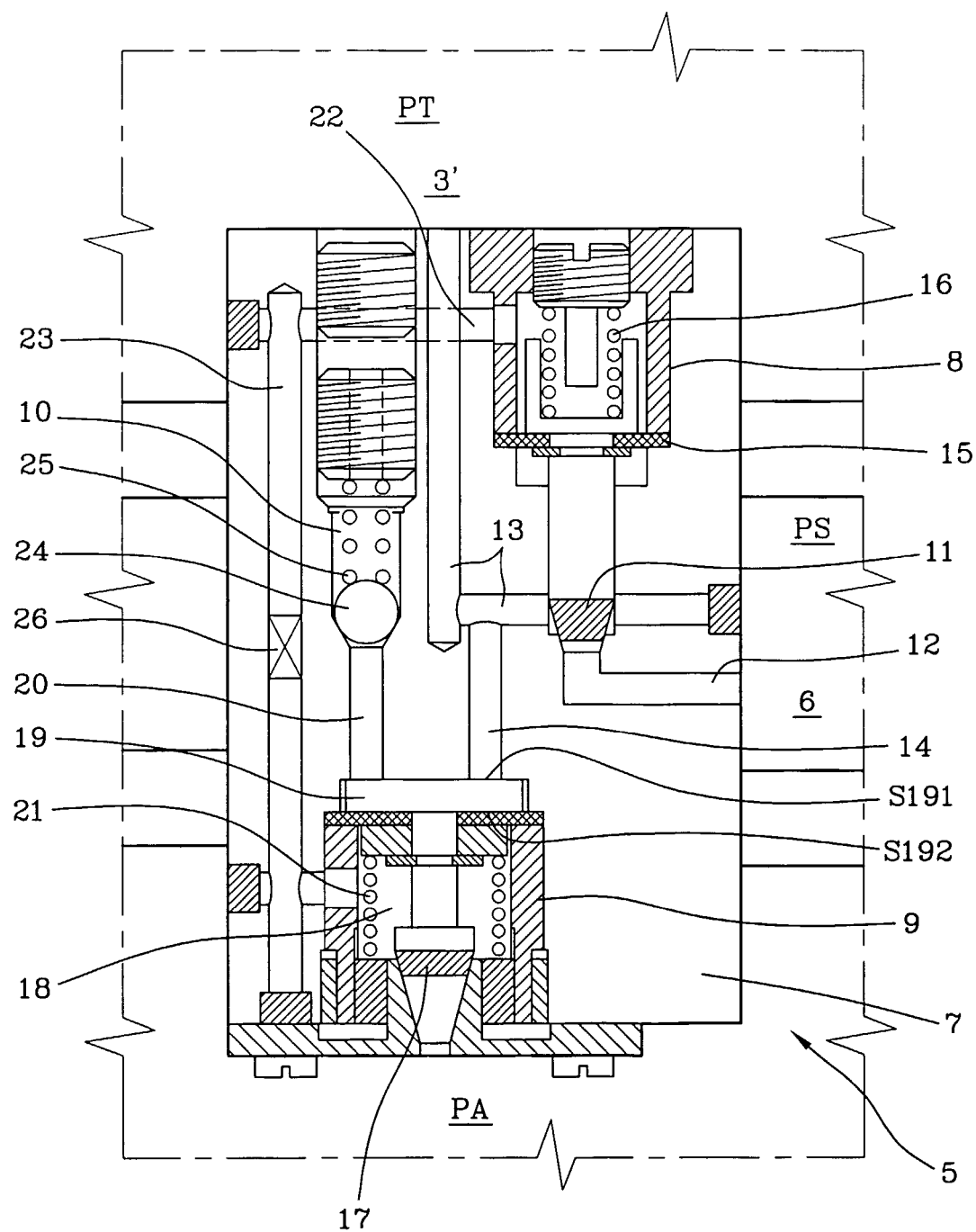
FIG. 2 is a vertical view in section of a component of the wheel shown in FIG. 1.

As shown in FIG. 2, in a first preferred embodiment said valve assembly 5 consists of a preferably metallic cylindrical body 7 in which a plurality of elements constituting the valve assembly are formed such as a command valve 8, an exhaust valve 9 and a compensation valve 10 operatively associated with each other by a plurality of ducts.

More specifically the command valve 8 controls flowing of said fluid between tank 4 and the inner volume 3'; the exhaust valve 9 is in communication with the external environment and with the command valve 8, and connects the inner volume 3' with the compensation valve 10; finally, the compensation valve 10 is in communication with said exhaust valve 9 and also with the command valve 8.

It will be recognised that in almost all the operating conditions, the inner volume 3' and the tank 4 have pressures different from each other and different from the atmospheric pressure present in the external environment. Herein and in the following, denoted at PT, PS and PA are the pressures existing within tyre 3, in tank 4 and in the external environment, respectively, whereas PTE identifies the operating pressure. i.e. the pressure that is wished to be maintained at the inside of tyre 3.

The command valve 8 is provided with a needle closure member 11 controlling passage between tank 4 (through duct 6) and the inner volume 3' of tyre 3, through ducts 12 and 13, and between tank 4 (through duct 6) and the exhaust valve 9 through ducts 12, 13 and 14.

The command valve 8 is further provided with an inner chamber 27; a plate-like element 15 operatively associated with the closure member 11 faces the inside of said chamber, so as to regulate intervention of said command valve 8 because it is necessary that the fluid at a greater pressure present in tank 4 should not fully flow into the inner volume 3' of tyre 3, but it must flow into said tyre until restoration of the operating pressure with a predetermined intervention threshold. For example, by giving an appropriate size to the area S15 (herein and in the following by the term area it is intended the useful area, i.e. the surface that can come into contact with said fluid) of the plate-like element 15 so that said area S15 is about five times the area S11 of the portion of the closure member 11 facing the duct 12, spontaneous flowing of the fluid towards the inner volume 3' of tyre 3 is avoided, once restoration of pressure PTE has been obtained. In fact, as better pointed out in the following, being pressure PTE known "a priori" and after fixing the maximum admissible pressure PS, it is possible to cause pressure PS not to be more than approximately five times greater than pressure PTE, in compliance with the above example. Finally the preload of an elastic element, preferably a spring 16, acting on said plate-like element 15 determines an intervention threshold (during a first inflation as illustrated in the following) of said command valve 8 and return to the closed position of the closure member 11 when the latter is not stressed. For example, if the value of said preload is such fixed that said value divided by area S11 is included between about 0.08 bar and 0.12 bar, and is preferably equal to about 0.1 bar, said value of 0.1 bar becomes the value of said intervention threshold on a first inflation.

The exhaust valve 9 is similar to the first valve 8, and exactly it comprises a needle closure member 17 controlling flowing of said fluid between a chamber 18 internal to the exhaust valve 9 and the external environment. At an opposite position to said closure member 17 and operatively associated therewith there is a further closure member 19 enabling connection between said inner volume 3' of tyre 3 and said compensation valve 10, causing running of said flow between duct 14 and another duct 20 connecting the exhaust valve 9 to the compensation valve 10.

The closure member 19 is physically placed between ducts 14, 20 and chamber 18, and has an area S191 on duct 14 and an area S192 on chamber 18, respectively. An elastic element, preferably a spring 21, acts on the area 192 of the closure member 19 by a force that, divided by the area S191, is included between about 0.4 bar and about 0.6 bar, preferably being equal to about 0.5 bar (which value, as shown in the following, regulates operation of the valve assembly 5 during the first loading step). Therefore, it is possible to write:

$$F21 = 0.5 \times S191$$

wherein F21 is the force generated by spring 21.

The exhaust valve 9 is such made that when the closure member 19 is not in contrast with ducts 14, 20, the overall area submitted to the pressure present in ducts 14, 20 becomes S191', slightly greater than S192, whereas in the opposite position the closure member 17 reaches its closed position.

It is finally to be noticed that the force F21 exerted by spring 21 meets the following relation:

$$(PT - 0.1) \times S191' = PT \times S192 + F21$$

This equation represents the force balance enabling upstroke of the closure member 19 when in ducts 14 and 20 the pressure is lower than PTE by at least 0.1 bar (and in chamber 18 there is still a pressure equal to PTE). This relation can be written again as:

$$F21 = PT \times (S191' - S192) - 0.1 \times S191'$$

It is to be noted that this force balance therefore imposes an intervention threshold for reloading of said tyre 3 in response to a pressure reduction, as better clarified in the following.

The compensation valve 10 controls the fluid flow towards the inner chamber 27 of the command valve 8 and towards the chamber 18 of the exhaust valve 9, by means of ducts 22 and 23, respectively. Provided in the compensation valve 10 is a closure member 24 operatively associated with an elastic element, preferably a spring 25, gauged in a manner adapted to have such a preload that a pressure substantially equivalent to pressure PTE is exerted.

In a first preferred embodiment, provided in duct 23 is a thermal compensation valve 26 that, for example, is thermally activated by a spring having an elastic constant being a function of the temperature (because made of a shape memory material (SMA) as shown in more detail in the following, for example), that interrupts passage through duct 23 below a given predetermined temperature or "threshold temperature" Tp, included between about −30° C. and about 0° C., for example.

As regards preloading of springs 16, 21 and 25, the following is pointed out.

Selection of the preload of spring 16 as a differential force between the forces acting on the plate-shaped element 15 and the closure member 11 is independent of the tyre pressure PT.

The force exerted by spring 21 meets the relation:

$$P21=PT\times(S191'-S192)-0.1\times S191'$$

but, since S191' is not much higher than S192, it means that S191'≅S192, so that it is possible to state without an important error that said force too does not depend on pressure PT.

Spring 25 is the one that actually regulates pressure PTE, and a preload regulation system by screw is advantageously provided therefor, so as to make the valve multipurpose, i.e. applicable to tyres with any operating pressure.

When inflation of tank 4 and tyre 3 is carried out, initially each portion of the valve assembly 5 has the same pressure than tyre 3 and tank 4, i.e. the pressure of the external environment PA.

Under these conditions the closure member 11 is in its closed position, the closure member 19 closes the passage between duct 14 and duct 20, the closure member 17 is in an open condition and brings the external environment into communication with chamber 18, and the closure member 24 is in a closed condition inhibiting passage from duct 20 to ducts 22 and 23. Finally the thermal compensation valve 26 is in an open condition because inflation takes place at a reference temperature included between about 0° C. and about 30° C., for example, which is higher than Tp.

Figure 3:
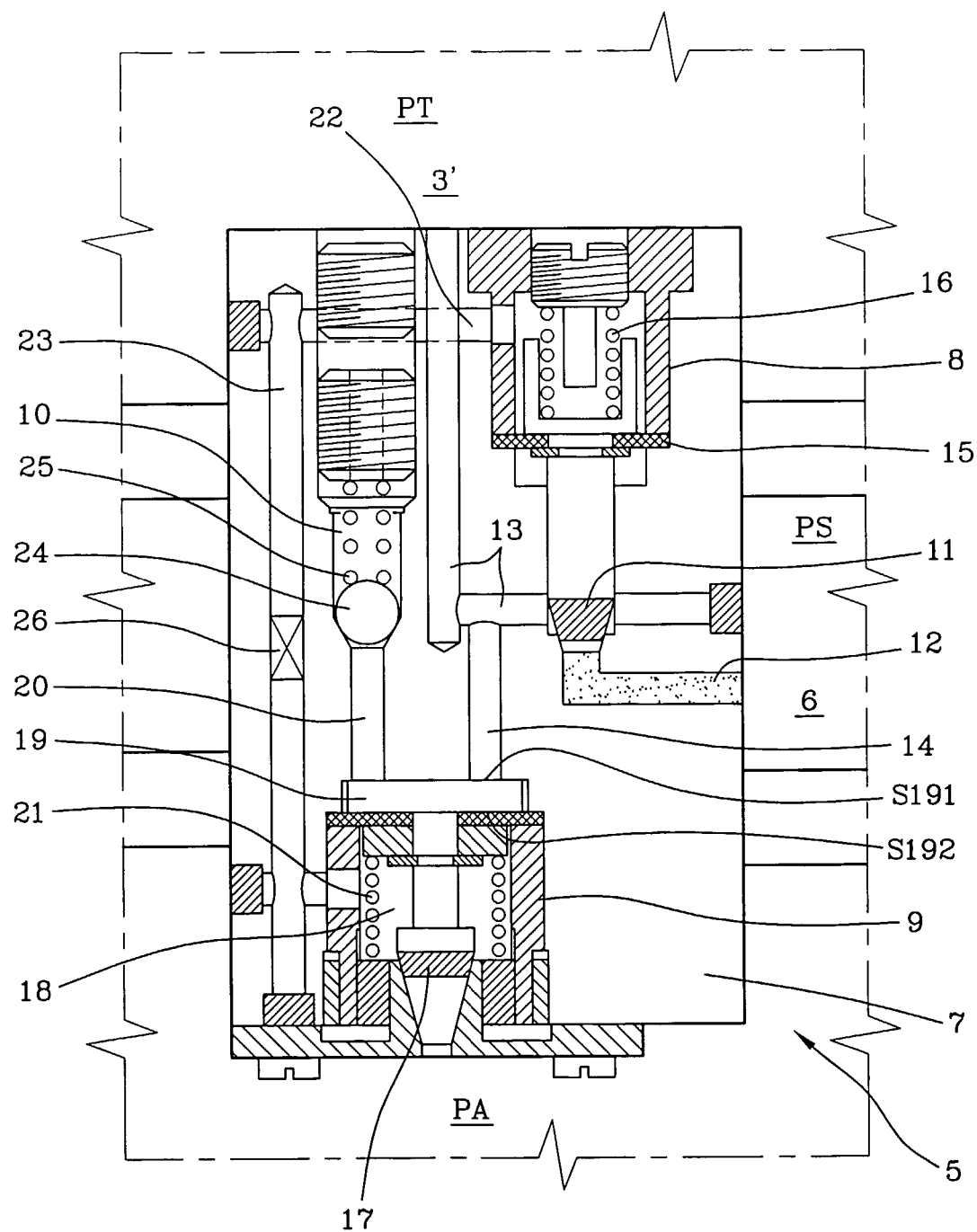
FIG. 3 shows an operating step of the component shown in FIG. 2.
Figure 4:
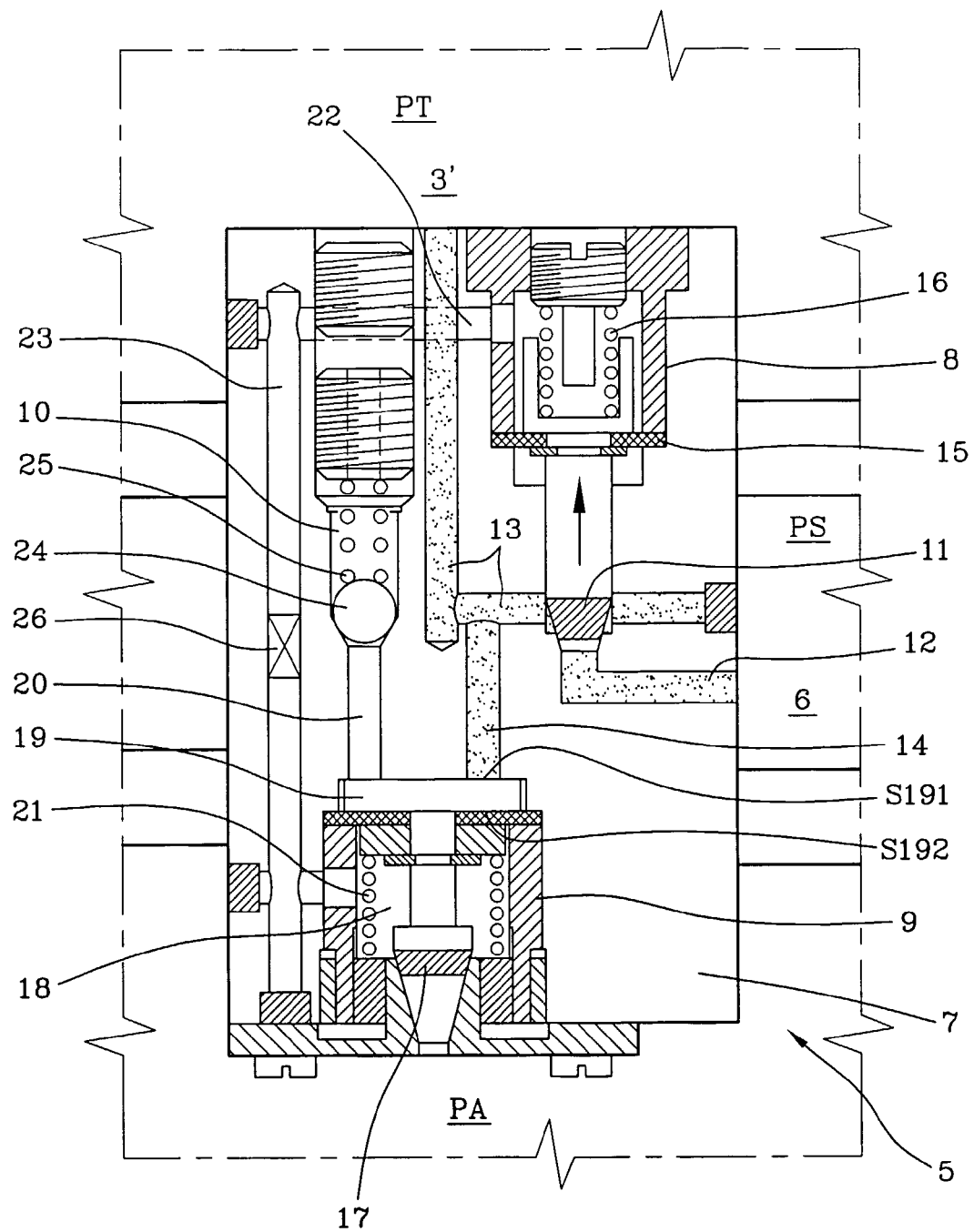
FIG. 4 shows a further operating step of the component shown in FIG. 2.

By admitting a fluid under pressure into tank 4, through said inflating valve 30 for example (FIG. 1), the pressure will begin rising in duct 12 too (FIG. 3). As soon as the pressure differential, i.e. the relative pressure with respect to the environmental pressure at the inside of duct 12 overcomes the value of 0.1 bar (FIG. 4), the closure member 11 goes to an open condition allowing passage of the fluid in ducts 13 and 14 and consequently into tyre 3, whereas all other elements of the valve assembly 5 keep to PA.

Figure 5:
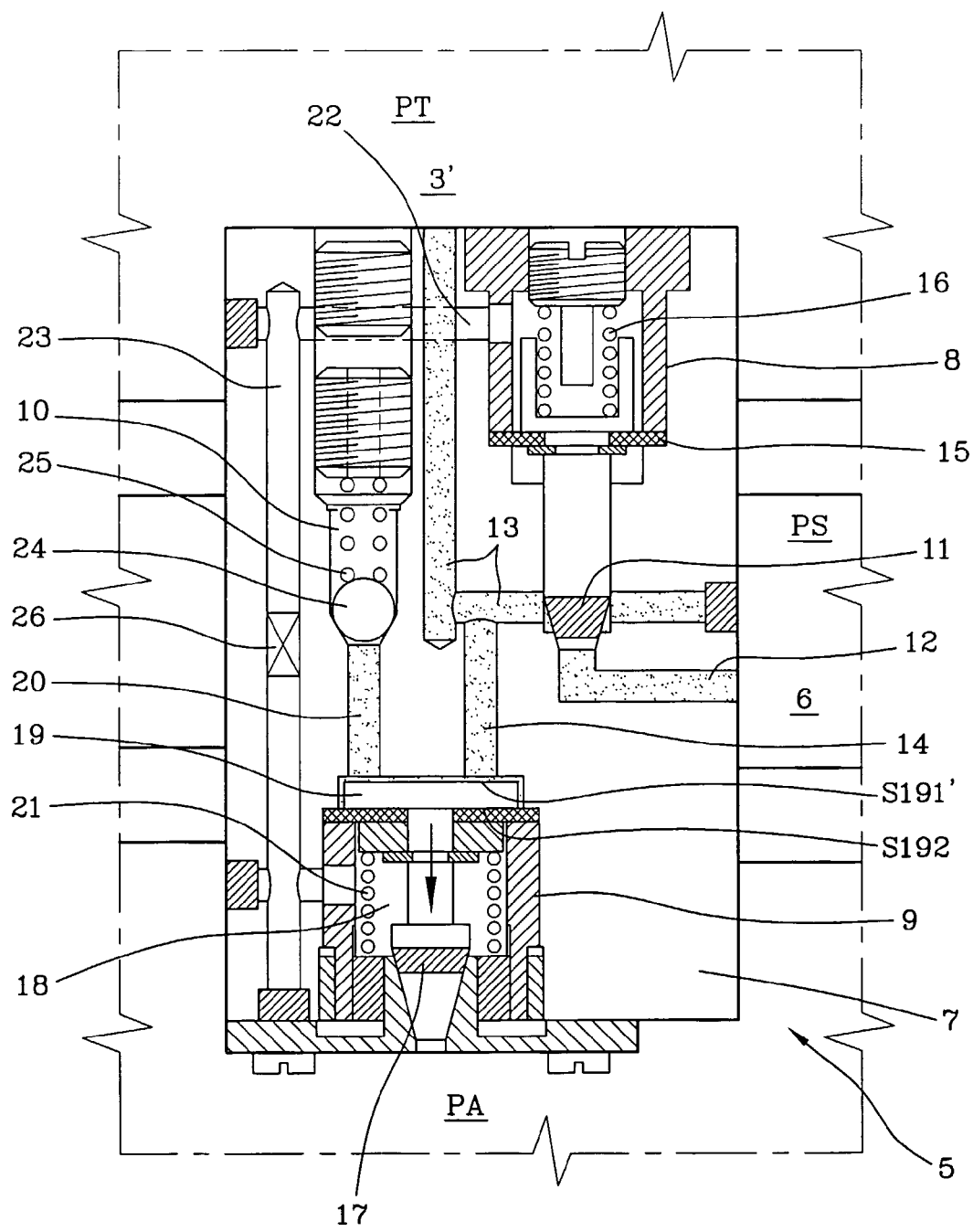
FIG. 5 shows a further operating step of the component shown in FIG. 2.

When the pressure differential in the inner volume 3' and in ducts 12, 13, 14 overcomes the value of 0.5 bar, the closure member 17 reaches its closed condition and isolates chamber 18 from the external environment, while the closure member 19 allows passage between duct 14 and duct 20 (FIG. 5), the closure member 24 keeping a closed position as it is preloaded to pressure PTE.

Figure 6:
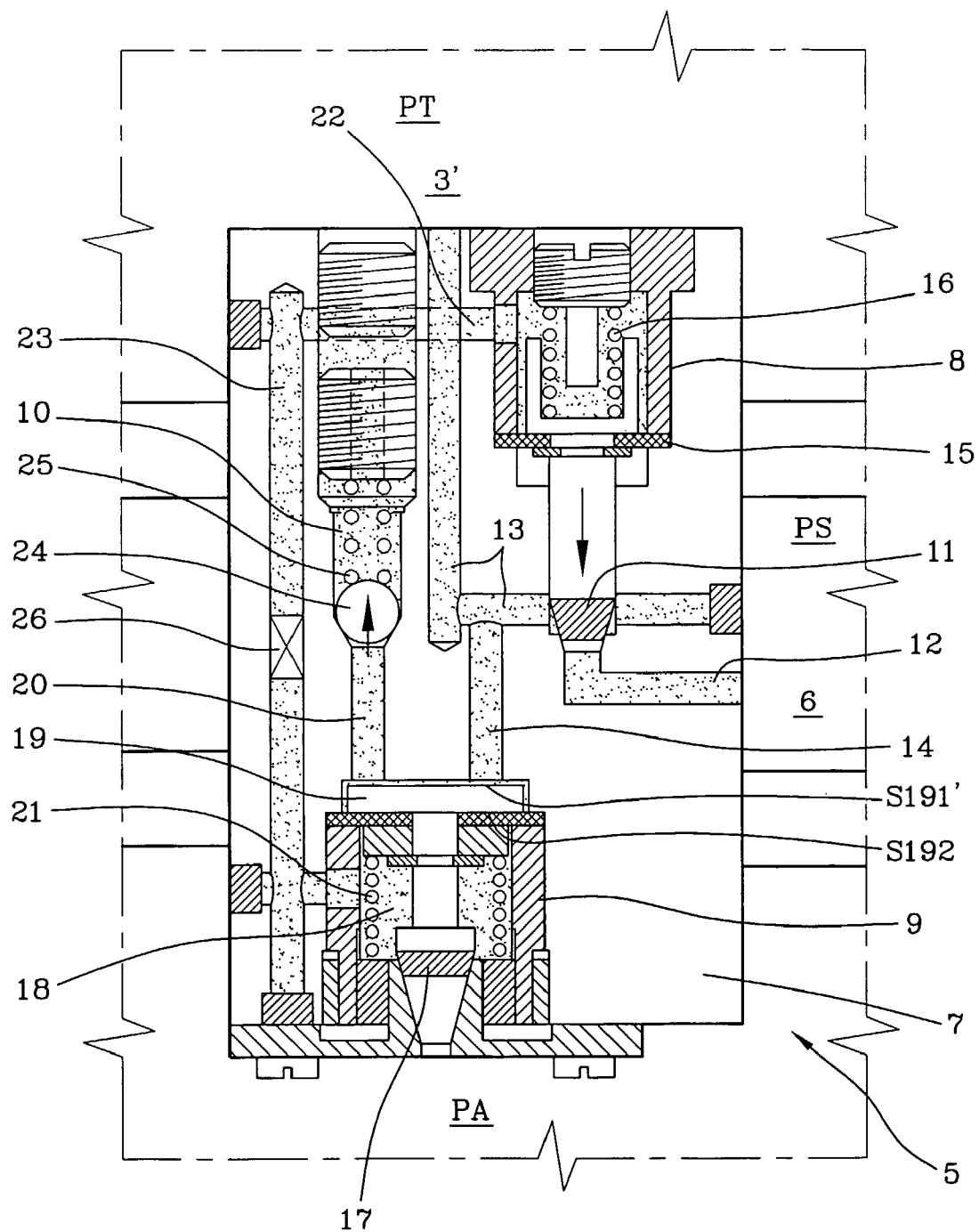
FIG. 6 shows a further operating step of the component shown in FIG. 2.

When the differential pressure corresponding to the tyre pressure under rated or working conditions PTE has been subsequently overcome, i.e. when tyre 3 is at the desired pressure, the closure member 24 goes to an open condition and the fluid begins flowing in ducts 22 and 23 as well (FIG. 6). More specifically, duct 22 transfers the pressure to the inner chamber 27 of valve 8 where, due to what previously said concerning the area ratios between the plate-like element 15 (areas equal to S15) and the closure member 11 (area S11), said closure member 11 reaches its closed condition; therefore, inflation of tyre 3 (to a pressure included between about 1.7 bar and about 5.5 bar) stops and inflation of tank 4 goes on until an initial or first pressure generally included between about 8.5 and about 10 bars. It will be recognised that the previous statements as regards ratios between PS and PTE are complied with, i.e. PS/PTE does not overcome the value of the ratio S15/S11 (substantially corresponding to 5 for the example herein shown).

Simultaneously, duct 23 brings chamber 18 to the same pressure as tyre 3. Under these conditions, where all is at pressure PTE, the closure member 19 does not carry out its upward stroke i.e. it does not reach its closed position (FIG. 7), because force F21 is not sufficient to overcome the effect due to the difference of areas S191', S192.

During operation of the vehicle on which wheels 1 in accordance with the invention are mounted, generally small air losses occur, either due to an imperfect airtightness of the radially inner layer of the carcass structure of the tyre for example, or due to an imperfect adhesion between the tyre bead and the rim flange on which the bead bears. These pressure losses can generally be of about 0.1 bar/month.

Figure 8:
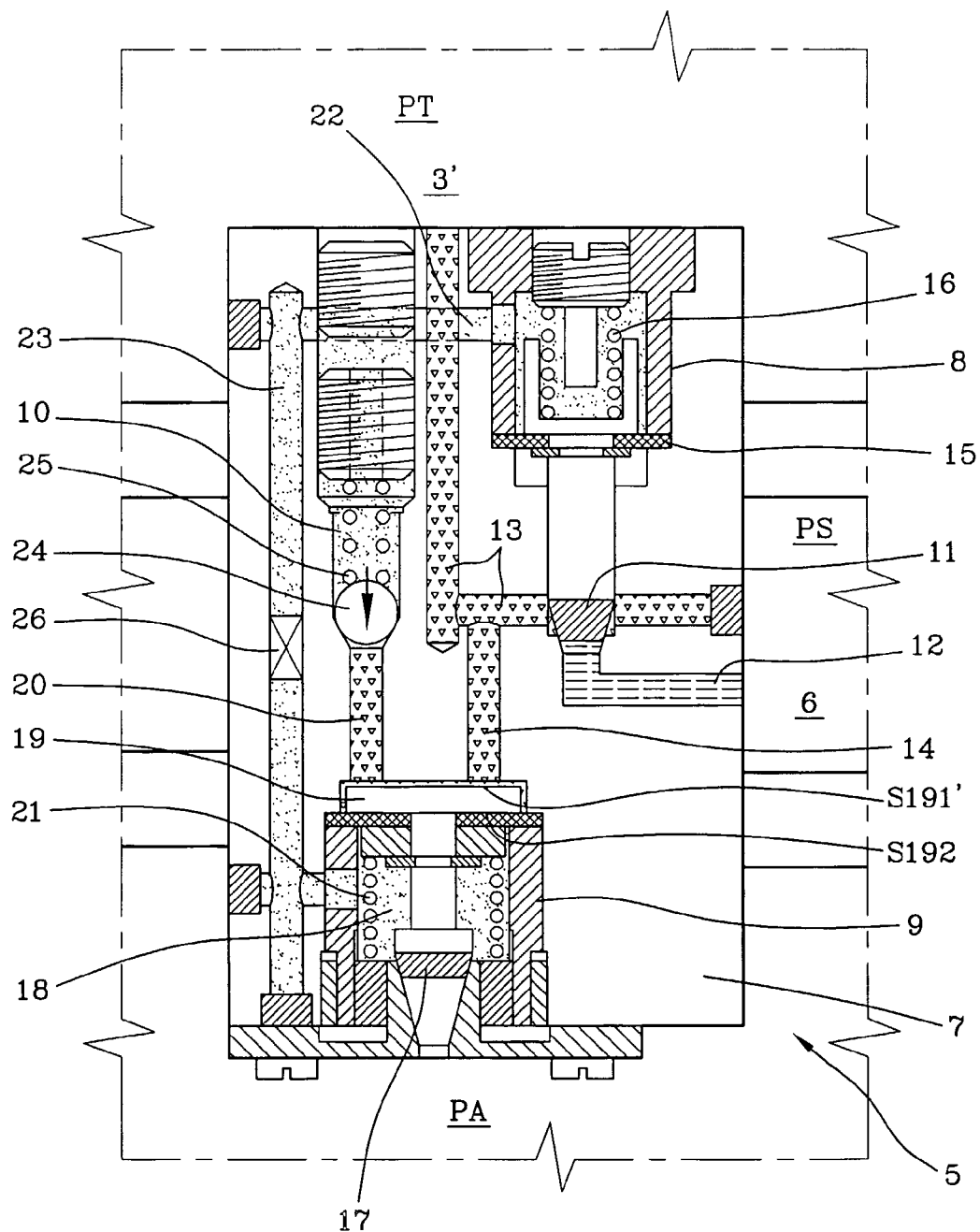
FIG. 8 shows a further operating step of the component shown in FIG. 2.
Figure 9:
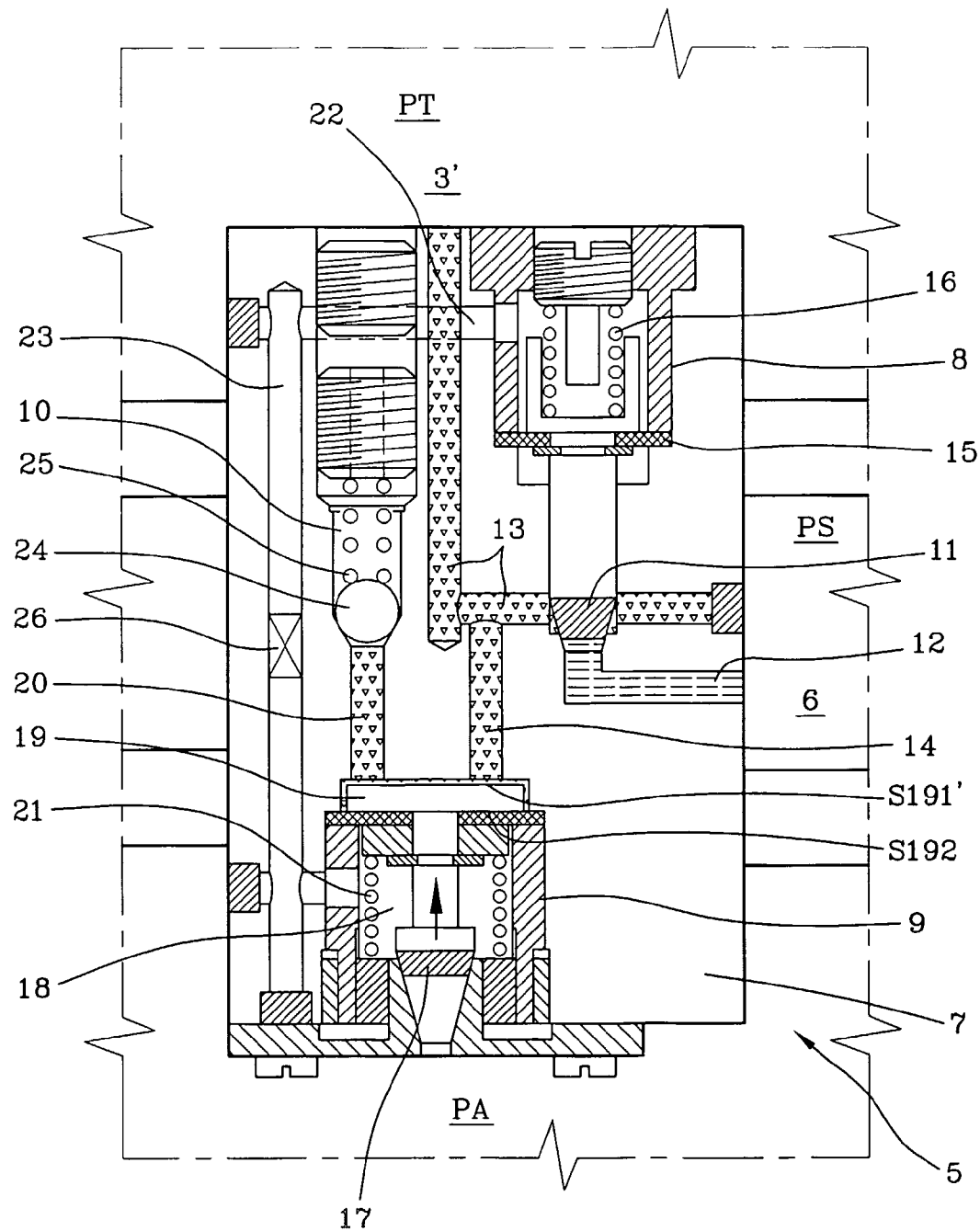
FIG. 9 shows a further operating step of the component shown in FIG. 2.

When the inner volume 3' of tyre 3 loses pressure for more than 0.1 bar (FIG. 8), the closure member 24 immediately reaches its closed position and isolates duct 20 from ducts 22 and 23. The force F21 of spring 21 becomes sufficient to cause the upward stroke of the closure member 19 that closes ducts 20 and 14, and simultaneously the closure member 17 opens the passage between chamber 18 and the external environment, so that chamber 18 is brought to pressure PA (FIG. 9).

Figure 10:
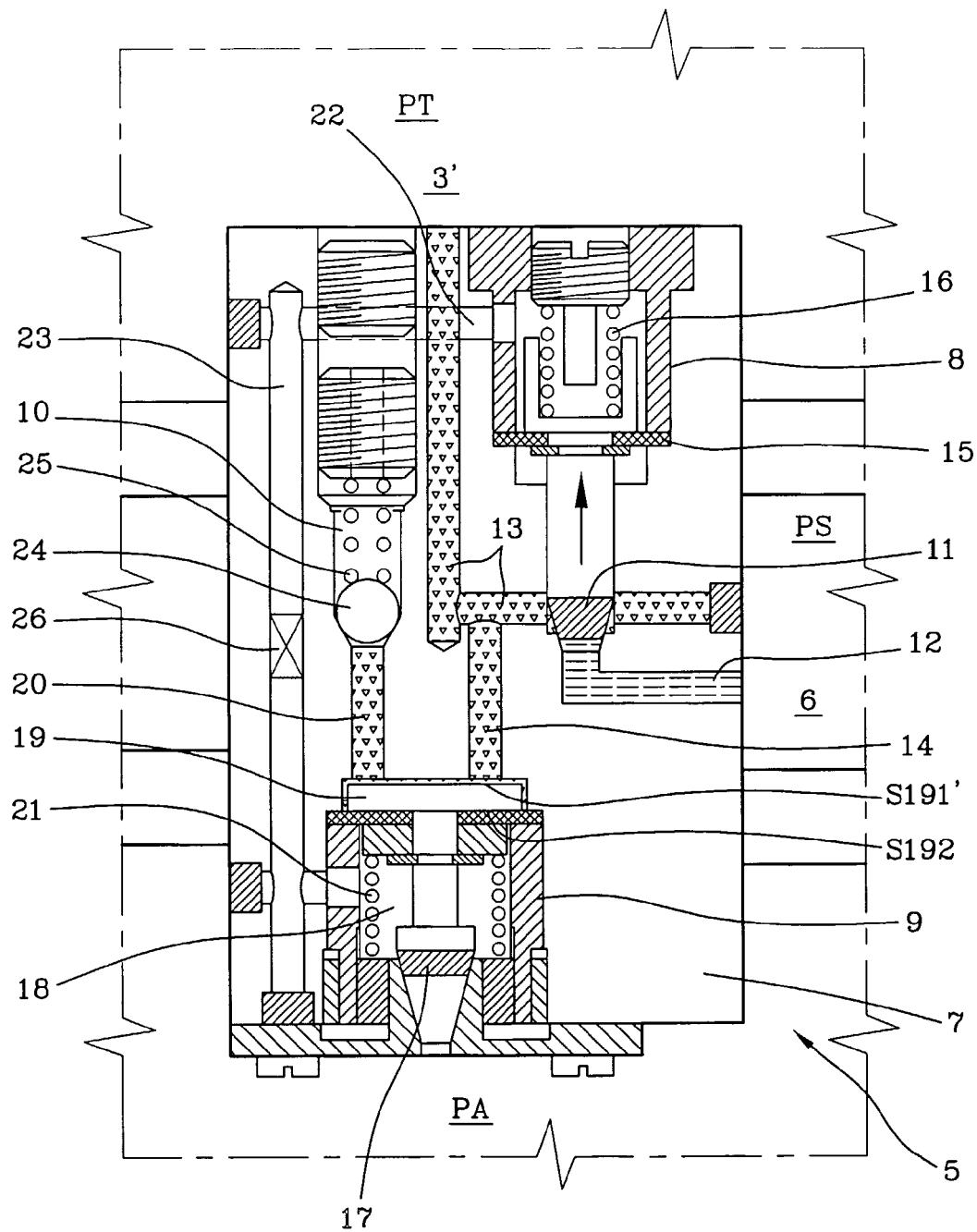
FIG. 10 shows a further operating step of the component shown in FIG. 2.

At this point, the same operating cycle as during loading is substantially followed (FIG. 10): duct 23 meanwhile is at the environmental pressure PA as well as duct 22, whereas the closure member 24 in a closed condition keeps duct 20 to the same pressure as tyre 3. Since the inner chamber 27 of the command valve 8 connected to duct 22 is to pressure PA as well, the closure member 11 opens enabling the fluid under pressure to flow from duct 12 to ducts 13, 14 and therefore into tyre 3. At this point the closure member 19 opens again and the closure member 17 closes because the pressure of the inner volume 3' for area S191' is greater than the force of the spring 21 alone.

Figure 7:
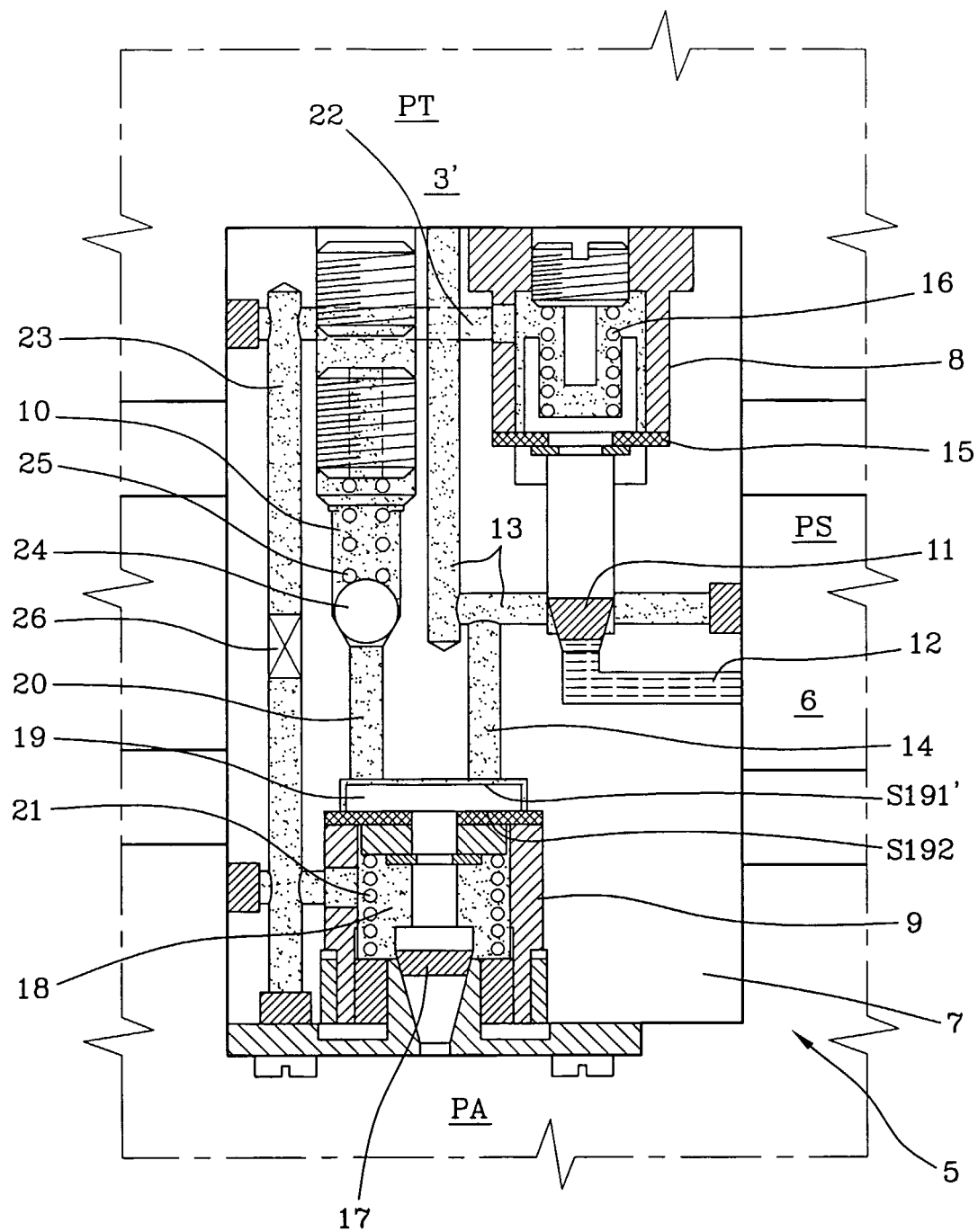
FIG. 7 shows a further operating step of the component shown in FIG. 2.

Once the operating pressure PTE has been restored in tyre 3, the closure member 24 opens again causing the pressure in the command valve 8 to rise again, said valve therefore driving the closure member 11 to its closed position so that tyre 3 reaches its conditions of end of inflation (FIG. 7).

It should be advantageously noted that the inside of the command valve 8 is at the environmental pressure to drive opening of the closure member 11 and it is therefore possible to utilise the pressure of tank 4 until said tank pressure reaches the operating pressure PTE. In addition, when tank 4 has reached the pressure PTE and tyre 3 tends to become more deflated, the closure member 24 does no longer reach its opened conditions (being pre-loaded to PTE), whereas the closure member 19 tends to close and the closure member 17 to open. Consequently, the closure member 11 opens again for the above reasons and tyre 3 can utilise all the residual differential pressure of tank 4, so that the tyre deflation takes place more slowly.

In other words this means that below PTE the inner volumes 3' of tyre 3 and tank 4 remain in communication with each other and deflation of them both takes place simultaneously so that the independence of same becomes longer.

The last-mentioned advantage is particularly important as regards safety of a vehicle using wheels in accordance with the invention. In fact in case of puncture, for the above reasons, tank 4 keeps in contact with the inner volume 3' of the tyre thereby preventing sudden lowering of the inner pressure which could lose the vehicle directional control.

Figure 13:
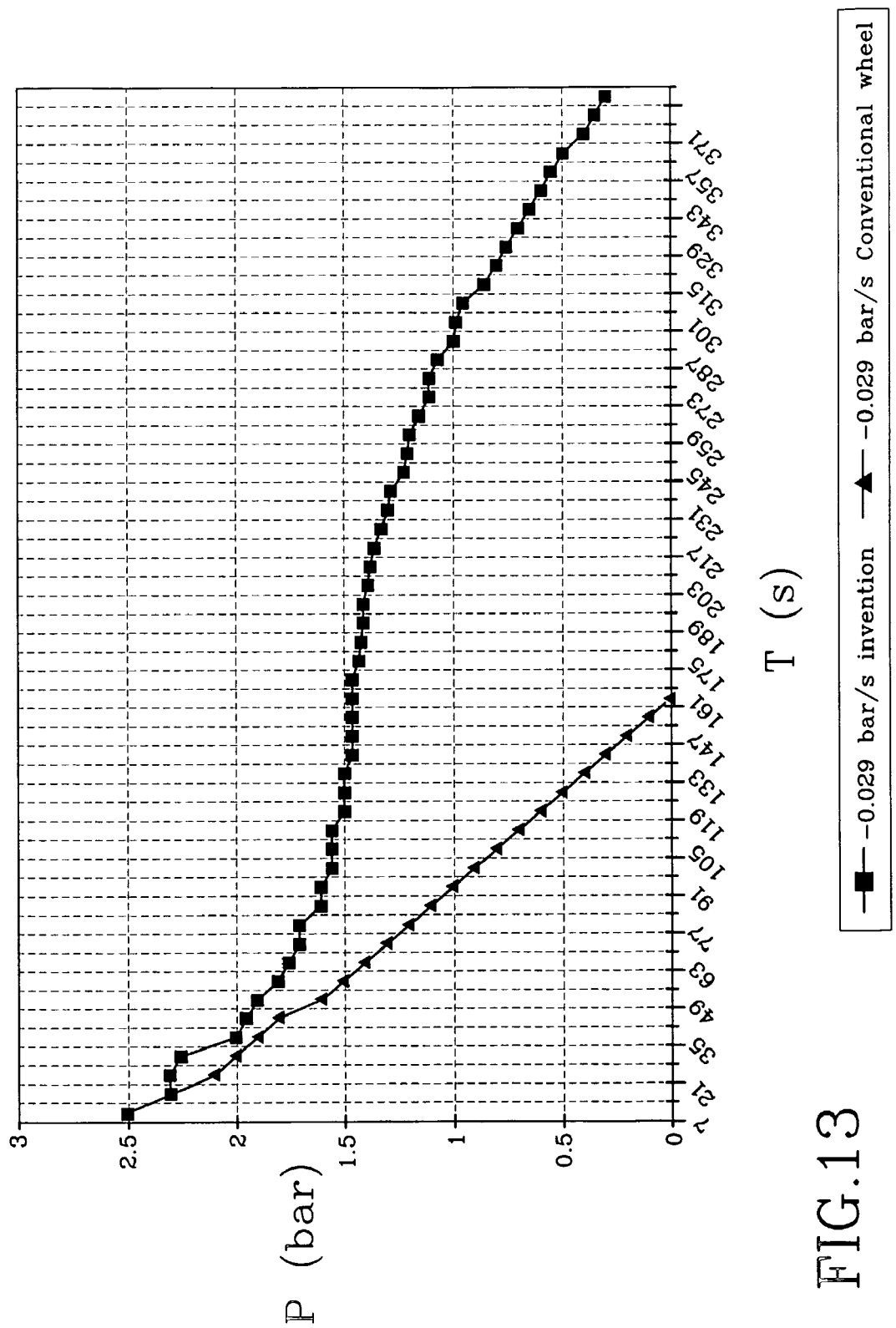
FIG. 13 is a graph showing the pressure variation in time in case of puncture, in a wheel in accordance with the invention and in a wheel of known type.

Shown in FIG. 13, in a diagram time(x axis)/pressure (y axis), are the results of puncture tests carried out on a wheel in accordance with the invention and on a conventional wheel (devoid of the tank and the valve assembly and only having a standard inflation/restoration valve inserted in the tyre), both wheels having the respective inner volumes of the tyre equal to 0.06 m$^3$ and an initial pressure of 2.5 bars. It is possible to see that by simulating a puncture causing an initial pressure loss of about 0.029 bar per second, in the wheel in accordance with the invention (equipped with a tank having a volume of 0.09 m and an initial pressure of about 9 bars), after about two minutes a residual pressure of about 1.5 bar is found against a pressure of about only 0.65 bar in the conventional wheel. After about 165 seconds the residual pressure in the wheel of the invention is still of about 1.45 bar, whereas said pressure in the conventional wheel has fallen to zero.

It can be easily understood that such a gradual pressure lowering allows the driver to safely stop the vehicle, always keeping control of same.

Operation is ensured even when the tyre temperature increases due to rolling, because the temperature of the fluid contained in the inner volume 3' is always higher than or equal to the temperature of the fluid contained in tank 4, so that the force acting on the plate-like element 15 will be always greater than the force acting on the closure member 11 due to the different concerned surfaces (S15, S11).

When on the contrary the pressure of the inner volume 3' decreases not due to a loss but due to a reduction of the inner temperature (under Tp), there is the intervention of valve 26 that closes duct 23. In this case the closure member 19 closes ducts 14 and 20, the closure member 17 reaches the open position, but in the external environment only the fluid present in chamber 18 and in duct 23 downstream of valve 26 is discharged, whereas duct 22 and consequently the inside of valve 8 keep the previous pressure, so that the closure member 11 does not open thereby avoiding an undesirable inflation.

Figure 11:
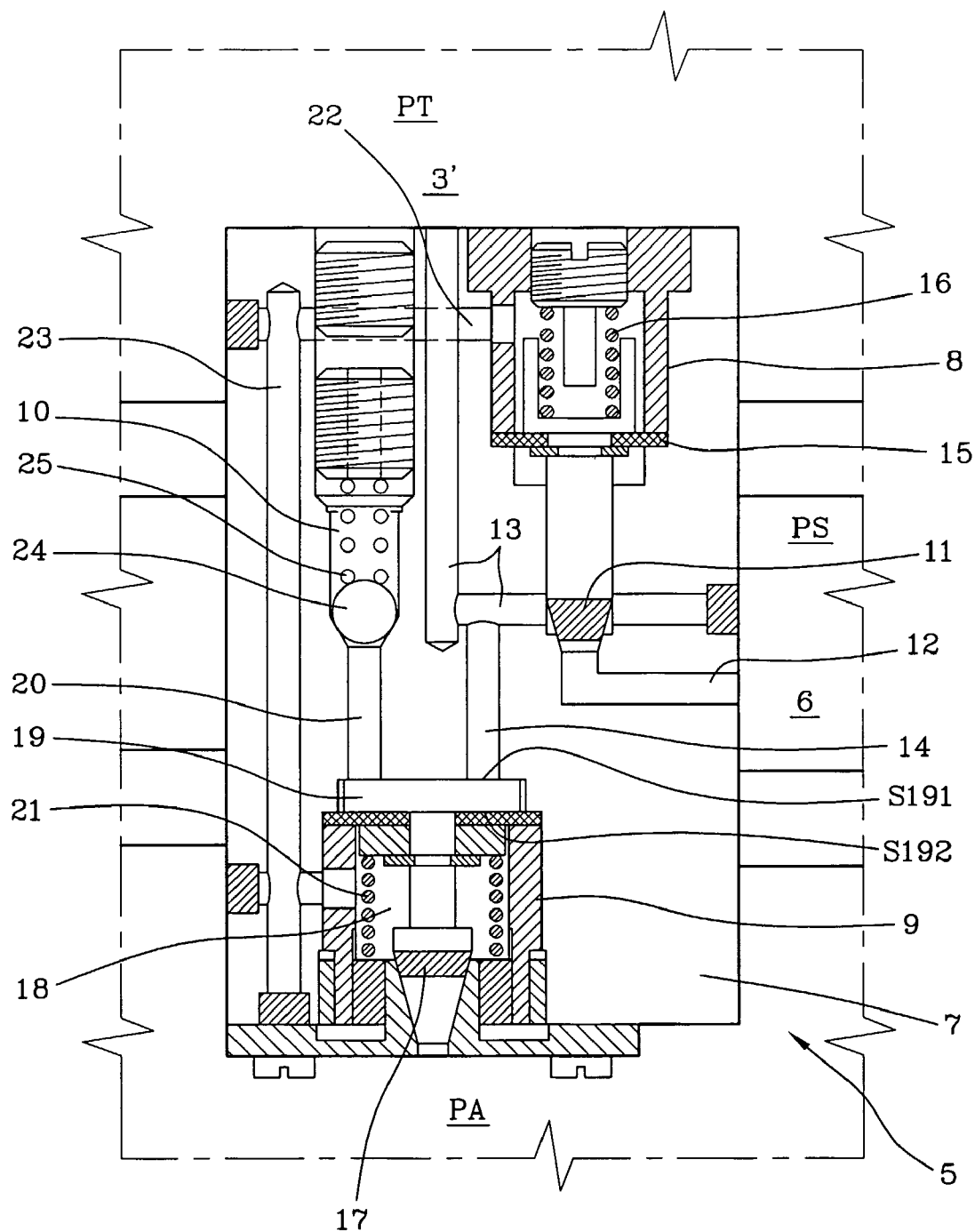
FIG. 11 is a vertical view in section of two alternative embodiments of the component of the wheel shown in FIG. 1.

In a second preferred embodiment of wheel 1, shown in FIG. 11, valve 26 is omitted, whereas spring 16 is made of a material of the shape memory type SMA and contemplates an elastic constant K that increases on decreasing of the temperature.

In this case, when temperature decreases, there is a pressure reduction in tyre 3 and therefore opening of the closure member 17. Simultaneously with discharge of duct 23 however, there is a load increase of spring 16, because the value of the elastic constant of said spring has increased. Following this phenomenon, opening of the closure member 11 does not occur, so that the unwanted passage of fluid from tank 4 to the inner volume 3' of tyre 3 is avoided.

In a different embodiment, still shown in FIG. 11, valve 26 is always omitted and spring 21 is made of a memory shape material SMA having an elastic constant K that decreases on decreasing of the temperature.

When the temperature decreases and the pressure in the inner volume 3' decreases, there is a simultaneous loss of load of spring 21, because the value of the elastic constant of said spring has decreased. The closure member 17 keeps closed and duct 23 is not discharged, so that no opening command reaches the closure member 11 of valve 8.

Figure 12:
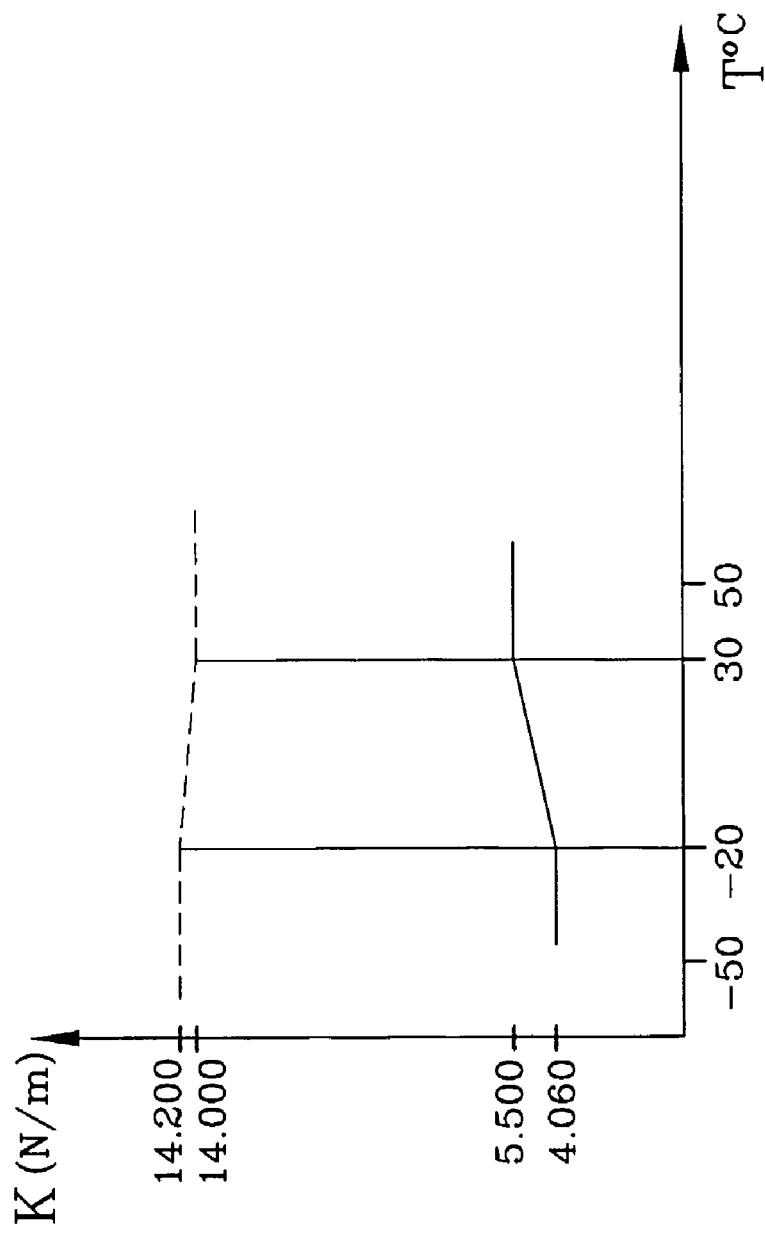
FIG. 12 is a graph showing the variation of an elastic constant of an element of said wheel component in accordance with the invention versus the temperature variation.

More specifically, shown in FIG. 12 for example, is how said elastic constant K depends on temperature; in FIG. 12 it is possible to see that said dependence in a graph Temperature(x axis)/Value of the elastic constant K(y axis) is expressed by a straight line substantially parallel to the x axis (chain line) for springs made of common spring steel materials (i.e. the elastic constant is in this case substantially independent of temperature) in a predetermined temperature range, between −50° C. and +50° C. for example; said dependence in said range is on the contrary expressed by an increasing or decreasing function for springs made of the above mentioned materials.

Preferably, in accordance with the invention, the elastic constant K of said springs greatly varies between about −50° C. and about +50° C., said range being preferably included between about −30° C. and about +50° C., and more preferably between about −30° C. and about +20° C.

In particular, in the last-mentioned temperature range (−30° C./+20° C.) the value of this constant K varies by about 26% with respect to the value found at the upper end of the range (+20° C.) for a spring (spring 21 in the embodiment in FIG. 11 or the spring employed in valve 26, for example) made of a nickel-titanium steel (wire diameter 1.2 mm, 2 useful coils), more specifically from about 5,500 N/m (at +20° C.) to about 4,060 N/m (at −30° C.).

The employed materials are in any case such selected that said variation can be included between about 10% and about 40%, preferably between about 20% and about 30% in a predetermined temperature range, at least included between −50° C. and +50° C. or more restricted.

More specifically, springs 16 and 21 shown in FIG. 11 and the spring optionally employed in valve 26 have a value of the elastic constant measured at the lower end of said range (at −50° C. ($K^{-50° C.}$) for example) that differs from the value of the elastic constant measured at the upper end of said range (at +50° C. ($K^{+50° C.}$)) for example) by at least 10% and preferably by no more than 40% with respect to the value of the elastic constant measured at the upper end of said range (at +50° C. ($K^{+50° C.}$)) for example), i.e.:

$$\Delta K = \frac{|K^{+50° C.} - K^{-50° C.}|}{K^{+50° C.}} * 100 \geq 10\%$$

and $$\Delta K = \frac{|K^{+50° C.} - K^{-50° C.}|}{K^{+50° C.}} * 100 \leq 40\%$$

Preferably these variations are included between 20% and 30%, i.e.:

$$\Delta K = \frac{|K^{+50° C.} - K^{-50° C.}|}{K^{+50° C.}} * 100 \geq 20\%$$

and $$\Delta K = \frac{|K^{+50° C.} - K^{-50° C.}|}{K^{+50° C.}} * 100 \leq 30\%$$

The same relations are also valid for more restricted temperature ranges, such as those previously mentioned, for example: −30° C./+50° C. and −30° C./+20° C., and consequently there will be a $K^{-30° C.}$ and a $K^{+20° C.}$.

For the previously illustrated example of a nickel-titanium steel it is therefore obtained:

$$\Delta K = \frac{|K^{+20°C.} - K^{-30°C.}|}{K^{+20°C.}} * 100 = 26,18\%$$

According to said preferred solution, this dependence of the elastic constant on temperature is represented by an increasing function within said predetermined temperature range (FIG. 12).

In the same FIG. 12 it is finally possible to see that a spring made of a tradition steel for springs, a steel Class C in accordance with UNI standards for example, has a substantially constant value of the elastic constant K in the same temperature range (−30° C./+20° C.), said value being substantially equal to about 14,000 N/m at +20° C. and equal to about 14,200 N/m at −30° C. from which it is possible to assume a variation $\Delta K$ equal to about 1.43% (for a wire diameter of 1.2 mm; 3.5 useful coils).

Finally it will be recognised that the provided range in accordance with the invention within which said elastic constant varies substantially comprises the room temperature of normal operation of wheel 1. This means that wheel 1 when it is working to such temperatures has a temperature-compensated pressure control because the closure member 11 does not allow communication between tank 4 and the inner volume 3' of tyre 3 if the pressure reduction is only due to variations in the room temperature.

The invention claimed is:

1. A method of controlling an inner pressure of a tyre mounted on a rim, comprising the steps of:
    inflating an inner volume of the tyre to an operating pressure and at a reference temperature;
    admitting a fluid compressed to a first pressure into a tank associated with the rim, said first pressure being higher than the operating pressure of the tyre at the reference temperature;
    establishing a communication between the inner volume of said tyre and said tank when the inner pressure of said tyre is lower than said operating pressure; and
    stopping the communication between said inner volume and said tank when said inner pressure of the tyre is substantially equal to said operating pressure,
    wherein said step of establishing a communication between the inner volume of the tyre and the tank is carried out by at least one valve assembly comprising a command valve, an exhaust valve and a compensation valve operatively associated with each other and comprising the steps of:
    transmitting a pressure reduction of the tyre to the exhaust valve; and
    generating a pressure reduction within the command valve through the exhaust valve so as to operate the command valve and bring said inner pressure to a value substantially equal to the operating pressure;
    said step of stopping said communication comprising the steps of:
        transmitting the inner pressure of the tyre, substantially equal to the operating pressure, to the exhaust valve and the compensation valve; and
        generating a pressure increase within the command valve through the compensation valve so as to operate the command valve to stop said communication.

2. The method as claimed in claim 1, wherein the ratio between said operating pressure of the tyre and said first pressure of said tank is about 0.1 to about 0.6.

3. The method as claimed in claim 1, wherein said first pressure in said tank is about 8.5 to about 10 bars.

4. The method as claimed in claim 1, wherein said pressure reduction within said command valve is generated by connecting an inner chamber of said command valve to the external environment.

5. The method as claimed in claim 4, wherein said connection between the command valve and the external environment is carried out through the step of opening a first closure member of said exhaust valve having an inner chamber that is brought into communication with the external environment.

6. The method as claimed in claim 5, wherein said step of opening said first closure member is carried out by the step of closing a second closure member operatively associated with the first closure member, to which a pressure substantially equivalent to that of the inner volume of the tyre is applied, externally of said exhaust valve.

7. The method as claimed in claim 5, wherein opening of said first closure member of said exhaust valve is controlled by an elastic element having an elastic constant varying within a temperature range of −50° C. to +50° C. in such a manner that said first closure member is maintained in a closed condition and said chamber is maintained isolated with respect to the external environment following a pressure reduction of the inner volume of the tyre due to a temperature reduction within said range.

8. The method as claimed in claim 1, wherein said pressure increase within said command valve is carried out by connecting the inside of said command valve with the inner volume of the tyre.

9. The method as claimed in claim 8, wherein said connection is carried out by said exhaust valve and compensation valve connected with each other by at least one duct, said exhaust valve being connected to the inner volume by at least one duct and said compensation valve being connected to an inner chamber of said command valve by at least one duct.

10. The method as claimed in claim 9, wherein said connection is carried out by the steps of:
    opening a second closure member of the exhaust valve to bring said inner volume into communication with the compensation valve through said ducts; and
    opening a closure member of the compensation valve to bring the compensation valve into communication with the inner chamber of the command valve through said at least one duct.

11. The method as claimed in claim 1, wherein said step of bringing the inner volume of said tyre into communication with said tank takes place at a temperature higher than a threshold temperature.

12. The method as claimed in claim 1, wherein operation of said command valve is controlled by an elastic element having an elastic constant varying within a temperature range of −50° C. to +50° C. in such a manner that a closure member of said command valve is maintained in a closed position following a pressure reduction of the inner volume of the tyre due to a temperature reduction within said range.

13. The method as claimed in claim 12, wherein said elastic element has a value of elastic constant measured at −50° C. ($K^{-50°C.}$) that differs from the value of elastic constant measured at +50° C. ($K^{+50°C.}$) by at least 10% with respect to the value of elastic constant measured at +50° C. ($K^{+50°C.}$).

14. The method as claimed in claim 12, wherein said elastic element has a value of elastic constant measured at −50° C. ($K^{-50°C.}$) that differs from the value of elastic constant measured at +50° C. ($K^{+50°C.}$) by no more than 40% with respect to the value of elastic constant measured at +50° C. ($K^{+50°C.}$).

15. A wheel having a controlled pressure, comprising:
    a rim associated with a tank adapted to be filled with a fluid to a first pressure;

a tyre mounted on said rim and having an inner volume inflated to an operating pressure at a reference temperature, said operating pressure being lower than said first pressure;

at least one valve assembly adapted to establish a communication between said tank, the inner volume of said tyre and an external environment, wherein said valve assembly comprises a command valve, an exhaust valve and a compensation valve operatively associated with each other; and wherein:

said command valve controls communication between said tank and said inner volume of the tyre; and said exhaust valve is connected to the external environment, to said inner volume, to said command valve and to said compensation valve, said compensation valve being connected with said exhaust valve and said command valve, wherein said command valve comprises an inner chamber connected to said exhaust valve and said compensation valve in such a manner that said command valve is operated by said exhaust valve and said compensation valve through a pressure variation of said inner chamber in response to a variation of the inner pressure of the tyre.

16. The wheel as claimed in claim 15, wherein said tank is integrated into said rim.

17. The wheel as claimed in claim 15, wherein said tank has such a volume that the ratio between said volume of said tank and said inner volume of the tyre is about 0.1 to about 0.4.

18. The wheel as claimed in claim 17, wherein said ratio is about 0.12 to about 0.25.

19. A wheel as claimed in claim 15, wherein said wheel comprises an inflating valve operatively associated with said tank.

20. The wheel as claimed in claim 19, wherein said inflating valve is integral with said valve assembly.

21. The wheel as claimed in claim 15, wherein said command valve comprises:

a closure member and a disc-shaped element operatively associated with each other and with the inner chamber;

said disc-shaped element being associated with an elastic element;

said closure member controlling said communication between said tank and said inner volume of the tyre; and said inner chamber being connected through at least one duct with said exhaust valve and compensation valve.

22. The wheel as claimed in claim 15, wherein said exhaust valve comprises:

a first closure member operatively associated with a second closure member in such a manner that when one of them is in an open condition the other is in a closed condition;

a chamber operatively associated with said first and second closure members;

said second closure member being associated with an elastic element;

said first closure member controlling opening of said second valve toward the external environment; and said second closure member controlling passage between at least two ducts to connect said compensation valve with the inner volume of said tyre.

23. The wheel as claimed in claim 22, wherein said elastic element has an elastic constant varying within a temperature range of $-50°$ C. to $+50°$ C. in such a manner as to maintain said first closure member in a closed condition and said chamber isolated with respect to the external environment following a pressure reduction of the inner volume of the tyre due to a temperature reduction within said range.

24. The wheel as claimed in claim 15, wherein said compensation valve comprises a closure member operatively associated with an elastic element to bring said inner volume of the tyre into communication with said inner chamber of said command valve and with a chamber of said exhaust valve.

25. The wheel as claimed in claim 15, wherein said valve assembly comprises a thermal compensation valve to be thermally activated so as to interrupt a connection between said chamber of said command valve and a chamber of said exhaust valve below a predetermined temperature.

26. The wheel as claimed in claim 25, wherein said thermal compensation valve is internally provided with an elastic element having an elastic constant varying within a temperature range of $-50°$ C. to $+50°$ C. in such a manner as to maintain said thermal compensation valve in a closed condition following a pressure reduction of the inner volume of the tyre due to a temperature reduction within said range.

27. The wheel as claimed in claim 26, wherein said elastic element has a value of elastic constant measured at $-50°$ C. ($K^{-50° C.}$) that differs from the value of elastic constant measured at $+50°$ C. ($K^{+50° C.}$) by at least 10% with respect to the value of elastic constant measured at $+50°$ C. ($K^{+50° C.}$).

28. The wheel as claimed in claim 26, wherein said elastic element has a value of elastic constant measured at $-50°$ C. ($K^{-50° C.}$) that differs from the value of elastic constant measured at $+50°$ C. ($K^{+50° C.}$) by no more than 40% with respect to the value of elastic constant measured at $+50°$ C. ($K^{+50° C.}$).

29. The wheel as claimed in claim 21, wherein said elastic element has an elastic constant varying within a temperature range of $-50°$ C. to $+50°$ C. in such a manner as to maintain said closure member in a closed position following a pressure reduction in the inner volume of the tyre due to a temperature reduction within said range.

30. A valve assembly suitable for a wheel having a controlled pressure, said valve assembly being adapted to establish a communication between a tank, an inner volume of a tyre provided in said wheel and an external environment, wherein said valve assembly comprises a command valve, an exhaust valve and a compensation valve operatively associated with each other, and wherein:

said command valve controls communication between said tank and said inner volume of the tyre;

said exhaust valve is connected to the external environment, to said inner volume, to said command valve and to said compensation valve;

said compensation valve is connected with said exhaust valve and said command valve, wherein said command valve comprises an inner chamber connected to said exhaust valve and said compensation valve in such a manner that said command valve is operated by said exhaust valve and said compensation valve through a pressure variation of said inner chamber in response to a variation of the inner pressure of the tyre.

31. The valve assembly as claimed in claim 30, wherein an inflating valve is integral with said valve assembly.

32. The valve assembly as claimed in claim 30, wherein said command valve comprises:

a closure member and a disc-shaped element operatively associated with each other and with the inner chamber;

said disc-shaped element being associated with an elastic element;

said closure member controlling said communication between said tank and said inner volume of the tyre; and said inner chamber being connected through at least one duct with said exhaust valve and compensation valve.

33. The valve assembly as claimed in claim 32, wherein said elastic element has an elastic constant varying within a temperature range of −50° C. to +50° C. in such a manner as to maintain said closure member in a closed position following a pressure reduction in the inner volume of the tyre due to a temperature reduction within said range.

34. The valve assembly as claimed in claim 30, wherein said exhaust valve comprises:
   a first closure member operatively associated with a second closure member in such a manner that when one of them is in an open condition the other is in a closed condition;
   a chamber operatively associated with said first and second closure members;
   said second closure member being associated with an elastic element;
   said first closure member controlling opening of said second valve toward the external environment; and
   said second closure member controlling passage between at least two ducts to connect said compensation valve with the inner volume of said tyre.

35. The valve assembly as claimed in claim 34, wherein said elastic element has an elastic constant varying within a temperature range of −50° C. to +50° C. in such a manner as to maintain said first closure member in a closed condition and said chamber isolated with respect to the external environment following a pressure reduction of the inner volume of the tyre due to a temperature reduction within said interval.

36. The valve assembly as claimed in claim 30, wherein said compensation valve comprises a closure member operatively associated with an elastic element to bring said inner volume of the tyre into communication with said inner chamber of said command valve and with a chamber of said exhaust valve.

37. The valve assembly as claimed in claim 30, wherein said valve assembly comprises a thermal compensation valve to be thermally activated so as to interrupt a connection between said chamber of said command valve and a chamber of said exhaust valve below a predetermined temperature.

38. The valve assembly as claimed in claim 37, wherein said thermal compensation valve is internally provided with an elastic element having an elastic constant varying within a temperature range of −50° C. to +50° C. in such a manner as to maintain said thermal compensation valve in a closed condition following a pressure reduction of the inner volume of the tyre due to a temperature reduction within said range.

39. The valve assembly as claimed in claim 38, wherein said elastic element has a value of elastic constant measured at −50° C. ($K^{-50°\ C.}$) that differs from the value of elastic constant measured at +50° C. ($K^{+50°\ C.}$) by at least 10% with respect to the value of elastic constant measured at +50° C. ($K^{+50°\ C.}$).

40. The valve assembly as claimed in claim 38, wherein said elastic element has a value of elastic constant measured at −50° C. ($K^{-50°\ C.}$) that differs from the value of elastic constant measured at +50° C. ($K^{+50°\ C.}$) by no more than 40% with respect to the value of elastic constant measured at +50° C. ($K^{+50°\ C.}$).

* * * * *